United States Patent
Tanaka et al.

(10) Patent No.: US 9,732,637 B2
(45) Date of Patent: Aug. 15, 2017

(54) WASTE HEAT RECOVERY SYSTEM AND WASTE HEAT RECOVERY METHOD

(71) Applicants: Kobe Steel, Ltd., Kobe-shi (JP); MIURA Co., Ltd., Matsuyama-shi (JP); ASAHI SHIPPING CO., LTD., Minato-ku (JP); TSUNEISHI SHIPBUILDING Co., Ltd., Fukuyama-shi (JP)

(72) Inventors: Yuji Tanaka, Kobe (JP); Kazuo Takahashi, Kobe (JP); Ryo Fujisawa, Kobe (JP); Shigeto Adachi, Takasago (JP); Yutaka Narukawa, Takasago (JP)

(73) Assignees: Kobe Steel, Ltd., Kobe-shi (JP); MIURA Co., Ltd., Matsuyama-shi (JP); ASAHI SHIPPING CO., LTD., Minato-ku (JP); TSUNEISHI SHIPBUILDING Co., Ltd., Fukuyama-shi (JP)

( * ) Notice: Subject to any disclaimer, the term of this patent is extended or adjusted under 35 U.S.C. 154(b) by 328 days.

(21) Appl. No.: 14/662,735

(22) Filed: Mar. 19, 2015

(65) Prior Publication Data
US 2015/0285103 A1 Oct. 8, 2015

(30) Foreign Application Priority Data

Apr. 4, 2014 (JP) .................. 2014-077647

(51) Int. Cl.
*F02B 33/00* (2006.01)
*F01K 23/02* (2006.01)
(Continued)

(52) U.S. Cl.
CPC .............. *F01K 23/02* (2013.01); *F01K 19/00* (2013.01); *F01K 23/065* (2013.01);
(Continued)

(58) Field of Classification Search
CPC ...... F01K 23/02; F01K 23/065; F01K 23/101; F02B 29/0462; F02B 29/0475
(Continued)

(56) References Cited

U.S. PATENT DOCUMENTS

| 3,888,084 A * | 6/1975 | Hawkins ............... F01K 23/065 60/614 |
| 2009/0211253 A1* | 8/2009 | Radcliff ............... F01K 23/065 60/670 |

(Continued)

FOREIGN PATENT DOCUMENTS

| CN | 101749096 A | 6/2010 |
| CN | 102691538 A | 9/2012 |

(Continued)

OTHER PUBLICATIONS

Office Action issued Jun. 22, 2016 in Korean Patent Application No. 10-2015-0045915 (with unedited computer generated English translation).

(Continued)

*Primary Examiner* — Jason Shanske
*Assistant Examiner* — Ngoc T Nguyen
(74) *Attorney, Agent, or Firm* — Oblon, McClelland, Maier & Neustadt, L.L.P.

(57) ABSTRACT

A waste heat recovery system includes: a heater which evaporates a working medium by exchanging heat between supercharged air supplied to an engine and the working medium; an expander which expands the working medium which has flowed out from the heater; a power recovery device connected to the expander; a condenser which condenses the working medium which has flowed out from the expander; a cooling medium supply pipe for supplying a cooling medium to an air cooler which cools the supercharged air which has flowed out from the heater; a cooling (Continued)

medium pump which is provided in the cooling medium supply pipe and which sends the cooling medium to the air cooler; and a branch pipe which bifurcates a part of the cooling medium flowing in the cooling medium supply pipe, to the condenser, in such a manner that the working medium is cooled by the cooling medium.

15 Claims, 2 Drawing Sheets

(51) Int. Cl.
| | |
|---|---|
| *F02B 29/04* | (2006.01) |
| *F01K 23/18* | (2006.01) |
| *F02B 61/00* | (2006.01) |
| *F01K 19/00* | (2006.01) |
| *F02M 31/04* | (2006.01) |
| *F02M 31/10* | (2006.01) |
| *F01K 23/06* | (2006.01) |
| *F01K 23/10* | (2006.01) |
| *F01P 3/20* | (2006.01) |
| *F02B 61/04* | (2006.01) |

(52) U.S. Cl.
CPC ............ *F01K 23/101* (2013.01); *F01K 23/18* (2013.01); *F02B 29/0443* (2013.01); *F02B 61/00* (2013.01); *F02M 31/042* (2013.01); *F02M 31/10* (2013.01); *F01P 3/207* (2013.01); *F02B 61/04* (2013.01); *Y02T 10/126* (2013.01); *Y02T 10/146* (2013.01); *Y02T 10/16* (2013.01)

(58) Field of Classification Search
USPC .............................................. 60/599; 123/563
See application file for complete search history.

(56) References Cited

U.S. PATENT DOCUMENTS

| | | | |
|---|---|---|---|
| 2010/0139626 A1 | 6/2010 | Raab et al. | |
| 2013/0068202 A1* | 3/2013 | Kardos | ..................... F02G 5/04 |
| | | | 123/563 |
| 2014/0075941 A1 | 3/2014 | Adachi et al. | |

FOREIGN PATENT DOCUMENTS

| | | |
|---|---|---|
| CN | 103670553 A | 3/2014 |
| JP | 55-25590 A | 2/1980 |
| JP | 56-47625 A | 4/1981 |
| JP | 60-108523 A | 6/1985 |
| JP | 2008-133728 A | 6/2008 |
| JP | 2011-149332 A | 8/2011 |
| JP | 2013-167241 A | 8/2013 |
| KR | 10-1110695 B1 | 2/2012 |
| KR | 10-2012-0053812 A | 5/2012 |

OTHER PUBLICATIONS

Combined Chinese Office Action and Search Report issued Mar. 24, 2016 in Patent Application No. 201510133245.6 (with partial English language translation and English translation of categories of cited documents).
Office Action dated May 9, 2017 in Japanese Patent Application No. 2014-077647 (with English machine translation).

* cited by examiner

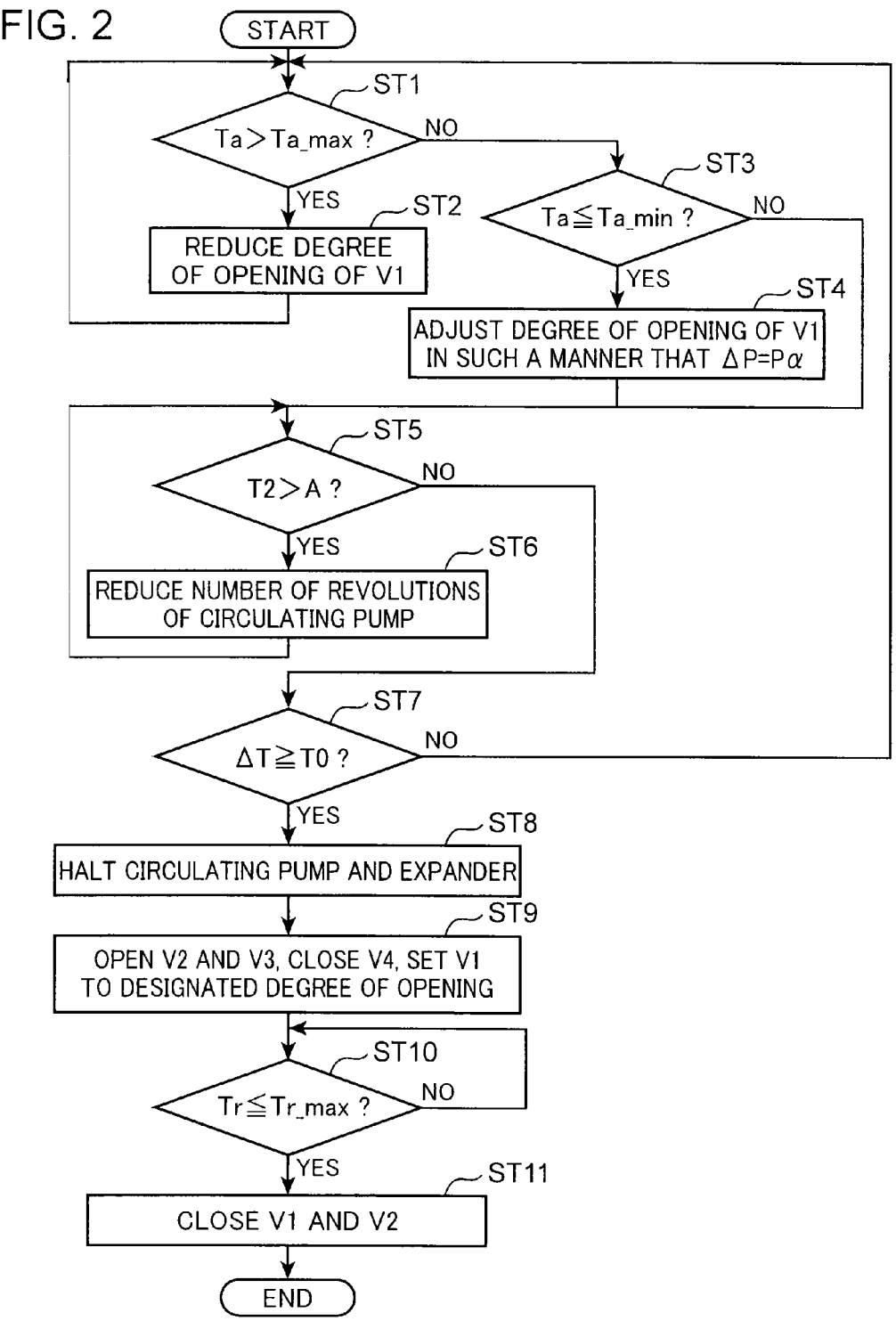

WASTE HEAT RECOVERY SYSTEM AND WASTE HEAT RECOVERY METHOD

TECHNICAL FIELD

The present invention relates to a waste heat recovery device and a waste heat recovery method.

BACKGROUND ART

Conventionally, a waste heat recovery system is known for recovering waste heat from supercharged air supplied to an engine from a supercharger. For example, Japanese Unexamined Patent Publication No. 2011-149332 discloses a waste heat recovery power generation device provided with an air cooler which cools compressed air supplied from a supercharger to an engine, a second waste heat recovery device, an evaporator, a turbine, a power generator connected to the turbine, and a condenser. The air cooler cools compressed air supplied to an engine from a supercharger, by a cooling medium which flows inside a first heat transfer pipe after being cooled by a cooling medium flowing inside a second heat transfer pipe. The second waste heat recovery device heats a heating medium by the waste heat recovered from the compressed air in the air cooler. The evaporator evaporates an organic fluid by exchanging heat between the heating medium and the organic fluid. The turbine expands the organic fluid which has flowed out from the evaporator. The condenser condenses the organic fluid which has flowed out from the turbine. Pure water or seawater is supplied to the first heat transfer pipe of the air cooler, as a cooling medium for cooling the compressed air. Furthermore, seawater is supplied to the condenser as a cooling medium for cooling the organic fluid.

In the waste heat recovery power generation device disclosed in Japanese Unexamined Patent Publication No. 2011-149332, the supply of a cooling medium (pure water or seawater) to the first heat transfer pipe of the air cooler and the supply of a cooling medium (seawater) to the condenser are carried out respectively by independent supply lines. Therefore, pumps are required respectively in each of the supply lines, and the structure is complicated.

SUMMARY OF INVENTION

An object of the present invention is to provide a waste heat recovery system capable of recovering waste heat in supercharged air which is supplied to an engine, by a simple configuration.

The waste heat recovery system according to one aspect of the present invention includes: a heater which evaporates a working medium by exchanging heat between supercharged air supplied to an engine and the working medium; an expander which expands the working medium which has flowed out from the heater; a power recovery device connected to the expander; a condenser which condenses the working medium which has flowed out from the expander; a cooling medium supply pipe for supplying a cooling medium to an air cooler which cools the supercharged air which has flowed out from the heater; a cooling medium pump which is provided in the cooling medium supply pipe and which sends the cooling medium to the air cooler; and a branch pipe which bifurcates a part of the cooling medium flowing in the cooling medium supply pipe, to the condenser, in such a manner that the working medium is cooled by the cooling medium.

Furthermore, the waste heat recovery method according to a further aspect of the present embodiment is a method for recovering the waste heat of the supercharged air supplied to the engine. This waste heat recovery method includes: an evaporating step of evaporating a working medium by a heater, by supplying the supercharged air to the heater; a cooling step of cooling the supercharged air by exchanging heat between the supercharged air which has flowed out from the heater and the cooling medium, by an air cooler; a power recovery step of recovering motive power from the working medium, by expanding the working medium which has flowed out from the heater, by an expander; and a condensing step of condensing the working medium which has flowed out from the expander, by a condenser. In the condensing step, the working medium is condensed in the condenser by bifurcating a part of the cooling medium supplied to the air cooler in the cooling step, to the condenser, and an amount of the cooling medium supplied to the condenser is adjusted in such a manner that a temperature of the supercharged air which has flowed out from the air cooler becomes equal to or less than a set temperature.

BRIEF DESCRIPTION OF DRAWINGS

FIG. 2 is a flowchart showing the control contents of a controller.

DESCRIPTION OF EMBODIMENTS

Figure 1:
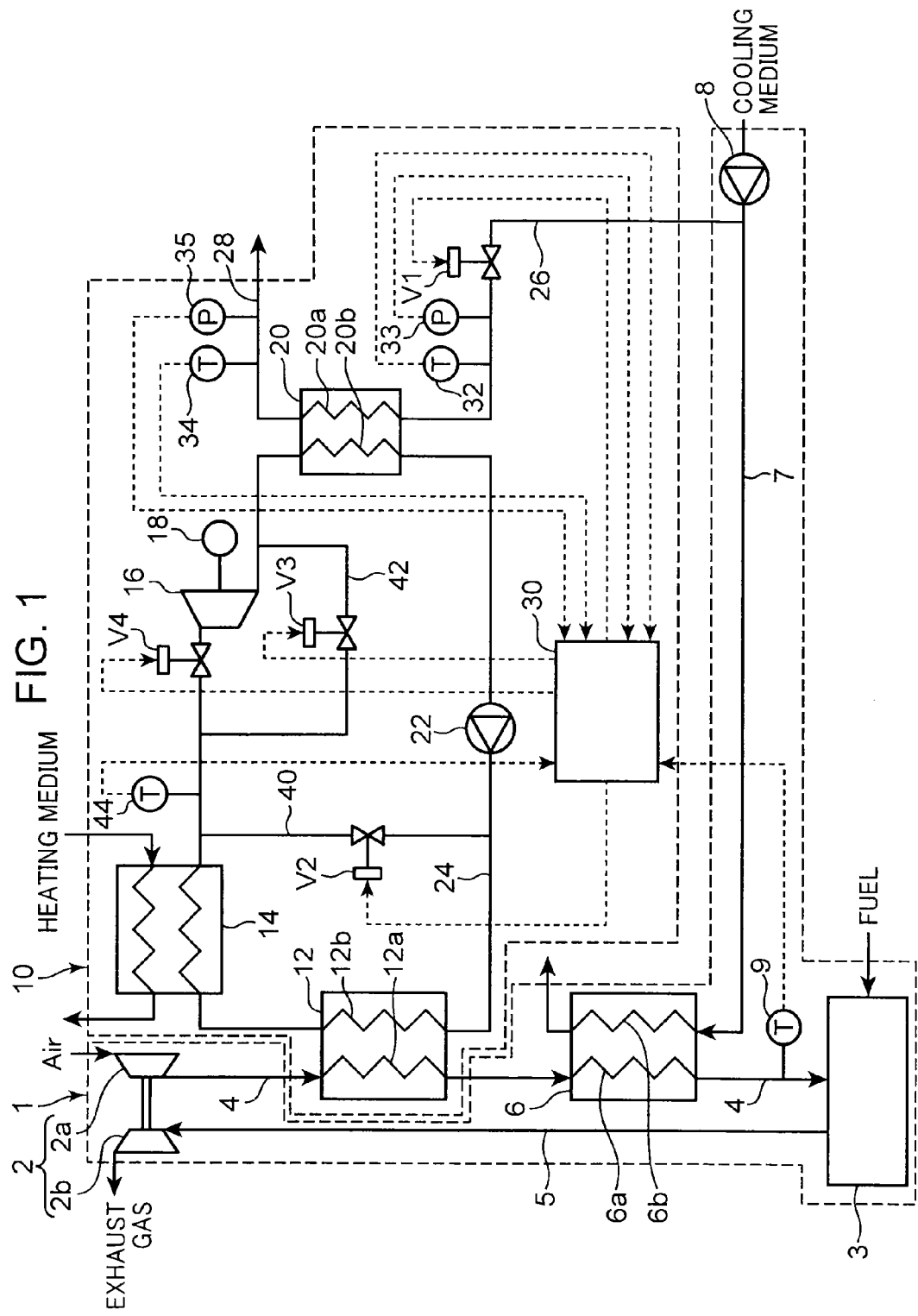
FIG. 1 is a diagram showing an overview of the configuration of a waste heat recovery device according to one embodiment of the present invention.

Below, embodiments of the present invention is described with reference to the drawings. The embodiments described below are concrete examples of the present invention and do not limit the technical scope of the present invention.

The waste heat recovery system according to one embodiment of the present invention is described with reference to FIG. 1 and FIG. 2.

As shown in FIG. 1, the waste heat recovery system is provided with a supercharger-equipped engine 1, and a waste heat recovery device 10 which recovers waste heat from the supercharger-equipped engine 1. In the present embodiment, the waste heat recovery system is installed in a ship.

The supercharger-equipped engine 1 has a supercharger 2, a ship engine 3, an air intake line 4, an air exhaust line 5, an air cooler 6 provided in the air intake line 4, a cooling medium supply pipe 7 for supplying a cooling medium, and a cooling medium pump 8 provided in the cooling medium supply pipe 7.

The supercharger 2 has a compressor 2a and a turbine 2b connected to this compressor 2a. Supercharged air which has been compressed by the compressor 2a is supplied to the air cooler 6 via the air intake line 4.

The air cooler 6 cools the supercharged air by exchanging heat between a cooling medium and the supercharged air which is discharged from the compressor 2a. More specifically, the air cooler 6 has a first flow channel 6a in which supercharged air supplied via the air intake line 4 flows, and a second flow channel 6b in which a cooling medium flows. The second flow channel 6b is connected to the cooling medium supply pipe 7. Consequently, cooling medium supplied via the cooling medium supply pipe 7 flows in the second flow channel 6b. In the present embodiment, seawater is used as a cooling medium. Supercharged air which has flowed out from the air cooler 6 is supplied to the engine 3 via the air intake line 4.

The exhaust gas of the engine 3 is sent to the turbine 2b via the air exhaust line 5. The turbine 2b is driven by the expansion energy of the exhaust gas, and the compressor 2a is driven by the drive force of the turbine 2b.

The waste heat recovery device 10 is provided with: a heater 12, an expander 16, a power recovery device 18, a condenser 20, a circulating pump 22, and a circulation flow channel 24 which connects the heater 12, the expander 16, the condenser 20 and the circulating pump 22, in this order.

The heater 12 is connected to a portion in the air intake line 4 between the compressor 2a and the air cooler 6. The heater 12 evaporates a working medium by exchanging heat between the working medium in liquid form, and the supercharged air which is compressed by the compressor 2a. More specifically, the heater 12 has a first flow channel 12a in which supercharged air supplied from the compressor 2a via the air intake line 4 flows, and a second flow channel 12b in which the working medium flows.

In the present embodiment, a heat exchanger 14 is provided in a portion of the circulation flow channel 24 on the downstream side of the heater 12. This heat exchanger 14 is connected to a vapor line which is provided inside the ship. In other words, the heat exchanger 14 heats the working medium by exchanging heat between the working medium which has flowed out from the heater 12 and surplus water vapor (a heating medium) generated by the ship. This heat exchanger 14 may be omitted.

The expander 16 is provided in a portion of the circulation flow channel 24 on the downstream side of the heat exchanger 14. In the present embodiment, a volume-type screw expander having a rotor which is driven to rotate by the expansion energy of a working medium in gas form which has flowed out from the heat exchanger 14 is used as the expander 16. More specifically, this expander 16 has a casing inside which a rotor chamber is formed, and a male/female pair of screw rotors which are supported rotatably inside the rotor chamber. In the expander 16, the screw rotor is driven to rotate by the expansion energy of the working medium in gas form supplied to the rotor chamber from an air intake port formed in the casing. The working medium of which the pressure has been reduced by expansion inside the rotor chamber is output into the circulation flow channel 24 from an exhaust port formed in the casing. The expander 16 is not limited to being a volume-type screw expander, and it is also possible to use a centrifugal or scroll type expander.

The power recovery device 18 is connected to the expander 16. In the present embodiment, a power generator is used as the power recovery device 18. This power recovery device 18 has a rotary shaft which is connected to one of the pair of screw rotors of the expander 16. The power recovery device 18 generates electric power due to the rotary shaft rotating with the rotation of the screw rotor. Apart from an electric power generator, it is also possible to use a compressor, or the like, as the power recovery device 18.

The condenser 20 is provided in a portion of the circulation flow channel 24 on the downstream side of the expander 16. The condenser 20 condenses (liquefies) the working medium by cooling with a cooling medium. More specifically, the condenser 20 has a first flow channel 20a in which the cooling medium flows and a second flow channel 20b in which the working medium which has flowed out from the expander 16 flows. The upstream side end of the first flow channel 20a is connected to a branch pipe 26. The branch pipe 26 bifurcates a part of the cooling medium, supplied towards the air cooler 6 by passing inside the cooling medium supply pipe 7, by means of the cooling medium pump 8, to the condenser 20. In other words, in the present embodiment, a part of the cooling medium (in the present embodiment, seawater) which is supplied to the air cooler 6 is used as a cooling medium for cooling the working medium in the condenser 20. Furthermore, the downstream-side end portion of the first flow channel 20a is connected to an exhaust pipe 28 by which the cooling medium is expelled.

The circulating pump 22 is provided in a portion of the circulation flow channel 24 on the downstream side of the condenser 20 (a portion between the heater 12 and the condenser 20). The circulating pump 22 pressurizes the working medium in liquid form which has been condensed by the condenser 20, to a predetermined pressure, and sends the working medium out to the downstream side of the circulating pump 22 in the circulation flow channel 24. A centrifugal pump provided with an impeller as a rotor, or a gear pump having a rotor consisting of a pair of gears, or the like, is used as the circulating pump 22.

As described above, in the present waste heat recovery system, a part of the cooling medium supplied to the air cooler 6 (the cooling medium sent out by the cooling medium pump 8) is directed to the condenser 20 via the branch pipe 26 which branches from the cooling medium supply pipe 7. Therefore, the cooling medium can be supplied to both the air cooler 6 and the condenser 20, by using the existing cooling medium pump 8 for supplying cooling medium to the air cooler 6. In other words, in the present system, it is possible to recover the waste heat of the supercharged air by a simple configuration in which a part of the cooling medium supplied to the air cooler 6 is branched off to the condenser 20, rather than providing a special pump for supplying the cooling medium to the condenser 20.

Furthermore, the engine 3 according to the present embodiment is a ship engine, and the cooling medium supply pipe 7 is configured so as to be able to supply seawater into the air cooler 6 as the cooling medium. The branch pipe 26 is configured so as to be able to supply seawater into the condenser 20, as the cooling medium. Therefore, it is possible to recover the waste heat of the supercharged air supplied to the ship engine 3, efficiently, by using seawater, rather than providing a special supply source for supplying a cooling medium to the air cooler 6 and the condenser 20.

Furthermore, the waste heat recovery device 10 according to the present embodiment further includes: an adjustment valve V1 provided in the branch pipe 26, a first bypass flow channel 40 which bypasses the heater 12, a first bypass valve V2 provided in the first bypass flow channel 40, a second bypass flow channel 42 which bypasses the expander 16, a second bypass valve V3 provided in the second bypass flow channel 42, a shut-off valve V4 which can shut off the inflow of the working medium to the expander 16, and a controller 30 which implements various controls.

The adjustment valve V1 is configured so that the degree of opening thereof can be adjusted. The flow amount of the cooling medium which is supplied to the condenser 20 from the branch pipe 26 varies in accordance with the degree of opening of the adjustment valve V1.

The first bypass flow channel 40 connects the portion of the circulation flow channel 24 between the circulating pump 22 and the heater 12, and the portion of the circulation flow channel 24 between the heat exchanger 14 and the expander 16.

The second bypass flow channel 42 connects the portion of the circulation flow channel 24 between the heat exchanger 14 and the expander 16, and the portion of the circulation flow channel 24 between the expander 16 and the condenser 20.

The shut-off valve V4 is provided in a portion of the circulation flow channel 24, on the downstream side of the connecting portion between the circulation flow channel 24 and the second bypass flow channel 42, and on the upstream side of the expander 16.

The controller 30 controls the degree of opening of the adjustment valve V1 on the basis of the temperature Ta of the portion of the air intake line 4 between the air cooler 6 and the engine 3. More specifically, the controller 30 controls the degree of opening of the adjustment valve V1 in such a manner that the detection value Ta of the temperature sensor 9 provided in the portion of the air intake line 4 between the air cooler 6 and the engine 3 is equal to or lower than the set temperature Ta_max. Furthermore, the controller 30 adjusts the degree of opening of the adjustment valve V1, in such a manner that the pressure differential $\Delta P$ obtained by subtracting the pressure P2 of the cooling medium after having flowed out from the condenser 20 from the pressure P1 of the cooling medium before flowing into the condenser 20 becomes a specified pressure P$\alpha$, when the detection value Ta is equal to or lower than a designated temperature Ta_min which is lower than the set temperature Ta_max. The pressure differential $\Delta P$ is calculated by subtracting the detection value P2 of the pressure sensor 35 provided in the exhaust pipe 28, from the detection value P1 of the pressure sensor 33 provided in the branch pipe 26. Since pressure loss occurs when the cooling medium flowing in the branch pipe 26 passes through the condenser 20, the pressure differential $\Delta P$ is a positive value.

Furthermore, the controller 30 controls the driving of the circulating pump 22 on the basis of the temperature of the cooling medium. More specifically, the controller 30 adjusts the number of revolutions of the circulating pump 22, in such a manner that the temperature T2 of the cooling medium after having flowed out from the condenser 20 is equal to or lower than a defined value A. Moreover, the controller 30 halts the circulating pump 22 when the temperature differential $\Delta T$ obtained by subtracting the temperature T1 of the cooling medium before flowing into the condenser 20 from the temperature T2 of the cooling medium after having flowed out from the condenser 20 is equal to or greater than a reference temperature T0. The temperature differential $\Delta T$ is calculated by subtracting the detection value T1 of the temperature sensor 32 provided in the branch pipe 26 from the detection value T2 of the temperature sensor 34 provided in the exhaust pipe 28. In this case, the controller 30 opens the first bypass valve V2 and the second bypass valve V3, and closes the shut-off valve V4, while maintaining the degree of opening of the adjustment valve V1 at a designated degree of opening. Thereupon, the controller 30 shuts the adjustment valve V1 when the temperature Tr of the working medium after merging of the working medium in gas form which has flowed out from the heat exchanger 14 and the working medium in liquid form which has passed through the first bypass flow channel 40 on the downstream side of the circulating pump 22, is equal to or lower than the threshold value Tr_max. The temperature Tr is detected by the temperature sensor 44 which is provided in a portion of the circulation flow channel 24 between the first bypass flow channel 40 and the expander 16, on the downstream side of the heat exchanger 14.

Below, the control contents of the controller 30 are described in detail with reference to FIG. 2.

When the waste heat recovery system is started up, the controller 30 determines whether or not the detection value Ta of the temperature sensor 9 provided in the portion of the air intake line 4 on the downstream side of the air cooler 6 is exceeding the set temperature Ta_max (step ST1). As a result of this, if the detection temperature Ta exceeds the set temperature Ta_max (YES at step ST1), the controller 30 reduces the degree of opening of the adjustment valve V1 (step ST2) and then returns again to step ST1. By reducing the degree of opening of the adjustment valve V1, a greater amount of cooling medium is supplied by the air cooler 6, and therefore the detection value Ta declines.

On the other hand, if the detection value Ta is equal to or lower than the set temperature Ta_max (NO at step ST1), then the controller 30 determines whether or not the detection temperature Ta is equal to or lower than the designated temperature Ta_min (step ST3). As a result of this, if the detection temperature Ta is equal to or lower than the designated temperature Ta_min (YES at step ST3), the controller 30 adjusts the degree of opening of the adjustment valve V1 in such a manner that the pressure differential $\Delta P$ becomes a specified pressure P$\alpha$ (step ST4). Consequently, the amount of cooling medium supplied to the condenser 20 is kept at a substantially uniform amount. More specifically, since there is a uniform relationship between the pressure differential $\Delta P$ and the amount of cooling medium flowing in the first flow channel 20a of the condenser 20, then it is possible to calculate the amount of cooling medium flowing in the first flow channel 20a, on the basis of this relationship and the pressure differential $\Delta P$. Therefore, by adjusting the degree of opening of the adjustment valve V1 in such a manner that the pressure differential $\Delta P$ becomes the specified pressure Pa, the amount of cooling medium supplied to the condenser 20 is stabilized.

After step ST4, when the detection value Ta is greater than the specified temperature Ta_min (NO at step ST3), the controller 30 determines whether or not the detection value T2 of the temperature sensor 34 provided in the exhaust pipe 28 is greater than a defined value A (step ST5). As a result of this, when the detection temperature T2 is greater than the defined value A (YES at step ST5), the controller 30 reduces the number of revolutions of the circulating pump 22 (step ST6), and then returns again to step ST5. By reducing the number of revolutions of the circulating pump 22, the flow amount of the working medium circulating through the circulation flow channel 24 is reduced. Therefore, the amount of heat supplied by the working medium to the cooling medium in the condenser 20 is reduced, whereby the detection value T2 is also reduced.

On the other hand, if the detection value T2 is equal to or lower than the defined value A (NO at step ST5), then the controller 30 determines whether or not the temperature differential $\Delta T$ is equal to or greater than the reference temperature T0 (step ST7). As a result of this, if the temperature differential $\Delta T$ is lower than the reference temperature T0 (NO at step ST7), then the controller 30 returns to step ST1. On the other hand, if the temperature differential $\Delta T$ is equal to or greater than the reference temperature T0 (YES at step ST7), then the controller 30 halts the circulating pump 22 and the expander 16 (step ST8).

Thereupon, the controller 30 opens the first bypass valve V2 and the second bypass valve V3, and closes the shut-off valve V4, while maintaining the degree of opening of the adjustment valve V1 at a designated degree of opening (step ST9). In this case, the working medium at high temperature which has recovered waste heat from the supercharged air in the heater 12 merges with the working medium in liquid form at low temperature which has passed through the first bypass flow channel 40 on the downstream side of the circulating pump 22. Consequently, the working medium at high temperature is cooled by the working medium in liquid form at low temperature, and then flows into the condenser 20 via the second bypass flow channel 42. In other words, the working medium at high temperature which flows out from the heater 12 is cooled by the working medium at low temperature which has passed through the first bypass flow channel 40, on the downstream side of the circulating pump 22.

Thereupon, the controller 30 determines whether or not the detection value Tr of the temperature sensor 44 which is provided in the portion of the circulation flow channel 24 between the heat exchanger 14 and the expander 16 is equal to or lower than the threshold value Tr_max (step ST10). As a result of this, when the detection value Tr is greater than the threshold value Tr_max (NO at step ST10), then the controller 30 again determines whether or not the detection value Tr is equal to or lower than the threshold value Tr_max (step ST10). On the other hand, when the detection value Tr is equal to or lower than the threshold value Tr_max (YES at step ST10), then the controller 30 closes the adjustment valve V1 and the first bypass valve V2 (step ST11). In this case, when the detection temperature Tr is equal to or lower than the threshold value Tr_max, the full amount of the cooling medium is supplied to the air cooler 6.

As described above, in the waste heat recovery system according to the present embodiment, the controller 30 adjusts the degree of opening of the adjustment valve V1 in such a manner that the temperature Ta of the supercharged air which has flowed out from the air cooler 6 becomes equal to or lower than the set temperature Ta_max. Therefore, supercharged air which has been cooled appropriately by the air cooler 6 in such a manner that the temperature thereof becomes the set temperature Ta_max or lower, is supplied to the engine 3, and the waste heat of the supercharged air is recovered effectively by the power recovery device 18.

Furthermore, when the detection temperature Ta is equal to or lower than the specified temperature Ta_min, then the controller 30 adjusts the degree of opening of the adjustment valve V1 in such a manner that the pressure differential ΔP of the cooling medium before and after the condenser 20 is the specified pressure Pα. Therefore, the amount of cooling medium supplied to the condenser 20 is stable. Consequently, it is possible to recover motive power stably by the power recovery device 18, in a state where the temperature of the supercharged air after having flowed out from the air cooler 6 is equal to or lower than the specified temperature Ta_min.

Moreover, since the controller 30 adjusts the number of revolutions of the circulating pump 22 in such a manner that the temperature T2 of the cooling medium after having flowed out from the condenser 20 is equal to or less than the defined value A, then the effects on the ambient environment of the cooling medium which has flowed out from the condenser 20 are suppressed.

In addition to this, the controller 30 halts the circulating pump 22 when the temperature differential ΔT of the cooling medium before and after the condenser 20 is equal to or greater than the reference temperature T0. By this means, damage to the system is suppressed. More specifically, when the temperature differential ΔT is equal to or greater than the reference temperature T0 (when the temperature of the cooling medium which has flowed out from the condenser 20 has become too high), the temperature of the working medium circulating through the circulation flow channel 24 becomes higher, and hence there is a concern that problems may occur, such as damage to the sealing material used in the system. On the other hand, in the present embodiment, the circulating pump 22 is halted when the temperature differential ΔT is equal to or greater than the reference temperature T0, and therefore damage to the system is suppressed.

In this case, the controller 30 opens the first bypass valve V2 and the second bypass valve V3, and closes the shut-off valve V4, while maintaining the degree of opening of the adjustment valve V1 at a designated degree of opening. Consequently, the working medium at high temperature flowed out from the heat exchanger 14 merges with the working medium at low temperature which has passed through the first bypass flow channel 40, on the downstream side of the circulating pump 22, and is thereby cooled by the working medium at low temperature. Accordingly, damage, etc., to the sealing material as a result of the working medium becoming too hot on the downstream side of the heater 12, is suppressed.

Thereupon, the controller 30 shuts the adjustment valve V1, when the temperature Tr of the working medium after merging of the working medium at high temperature which has flowed out from the heat exchanger 14 and the working medium at low temperature which has passed through the first bypass flow channel 40, has become equal to or lower than the threshold value Tr_max. Consequently, it is possible to cool the supercharged air efficiently in the air cooler 6, after the temperature Tr has become equal to or lower than the threshold value Tr_max.

The embodiment disclosed here is exemplary in all respects and should not be regarded as restrictive. The scope of the present invention is indicated by the scope of the claims and not by the description given above, and includes all modifications within the same sense and scope as the claims.

For example, in the embodiment described above, an example is given when the waste heat recovery system is installed in a ship, but the waste heat recovery system may be applied to an internal combustion engine other than a ship.

Furthermore, in the embodiment described above, an example is given in which the controller 30 adjusts the degree of opening of the adjustment valve V1 (step ST3 and step ST4) in such a manner that the pressure differential ΔP is a specified pressure Pα when the detection temperature Ta is equal to or lower than the designated temperature Ta_min, but the control contents of the controller 30 are not limited to this. For example, the controller 30 may adjust the degree of opening of the adjustment valve V1 in such a manner that the temperature differential ΔT becomes the specified temperature Ta, when the detection value Ta is equal to or lower than the specified temperature Ta_min. In this case, the degree of opening of the adjustment valve V1 is adjusted in accordance with values stored in the controller 30 as a map indicating a relationship between the temperature differential ΔT and the amount of cooling medium flowing in the branch pipe 26. In this case also, the amount of cooling medium supplied to the condenser 20 is stable.

Furthermore, in the embodiment described above, an example is given in which the controller 30 halts the circulating pump 22 when the temperature differential ΔT is equal to or greater than the reference temperature T0 (step ST7 and step ST8), but the control contents of the controller

30 are not limited to this. For instance, the controller 30 may halt the circulating pump 22 when the pressure differential ΔP is equal to or lower than the reference pressure P0. In this case also, damage to the waste heat recovery system is suppressed.

The embodiments described above are now summarized.

The waste heat recovery system according to the present embodiment includes: a heater which evaporates a working medium by exchanging heat between supercharged air supplied to an engine and the working medium; an expander which expands the working medium which has flowed out from the heater; a power recovery device connected to the expander; a condenser which condenses the working medium which has flowed out from the expander; a cooling medium supply pipe for supplying a cooling medium to an air cooler which cools the supercharged air which has flowed out from the heater; a cooling medium pump which is provided in the cooling medium supply pipe and which sends the cooling medium to the air cooler; and a branch pipe which bifurcates a part of the cooling medium flowing in a portion of the cooling medium supply pipe on the downstream side of the cooling medium pump and on the upstream side of the air cooler, to the condenser, in such a manner that the working medium is cooled by the cooling medium.

In the present waste heat recovery system, a part of the cooling medium supplied to the air cooler (the cooling medium sent out by the cooling medium pump) is directed to the condenser via a branch pipe which branches from the cooling medium supply pipe, and therefore the cooling medium can be supplied to both the air cooler and the condenser by using the existing cooling medium pump for supplying cooling medium to the air cooler. In other words, in the present system, it is possible to recover the waste heat of the supercharged air by a simple configuration in which a portion of the cooling medium supplied to the air cooler is branched off to the condenser, rather than providing a special pump for supplying the cooling medium to the condenser.

In this case, desirably, the waste heat recovery system further includes: an adjustment valve which is provided in the branch pipe, the degree of opening thereof being adjustable; and a controller which controls the degree of opening of the adjustment valve in such a manner that a temperature of the supercharged air which has flowed out from the air cooler is equal to or lower than a set temperature.

In this aspect of the invention, since the controller adjusts the degree of opening of the adjustment valve, then it is possible to recover the waste heat of the supercharged air efficiently in the power recovery device, while obtaining supercharged air which has been cooled appropriately by the air cooler in such a manner that the temperature thereof becomes equal to or lower than the set temperature.

Furthermore, in this case, desirably, the waste heat recovery system further includes a circulating pump which sends the working medium which has flowed out from the condenser to the heater, wherein the controller halts the circulating pump, when a temperature differential obtained by subtracting the temperature of the cooling medium before flowing into the condenser from the temperature of the cooling medium after having flowed out from the condenser has become equal to or greater than a reference temperature, or when a pressure differential obtained by subtracting a pressure of the cooling medium after having flowed out from the condenser from the pressure of the cooling medium before flowing into the condenser has become equal to or lower than a reference pressure.

By this means, damage to the system is suppressed. More specifically, when the temperature differential is equal to or greater than the reference temperature, or when the pressure differential is equal to or lower than the reference pressure (when the temperature of the cooling medium which has flowed out from the condenser has become too high), the temperature of the working medium becomes higher, and hence there is a concern that problems may occur, such as damage to the sealing material used in the system. On the other hand, in the present embodiment, the circulating pump is halted, when the temperature differential has become equal to or greater than the reference temperature, or when the pressure differential has become equal to or lower than the reference pressure, and therefore damage to the system is suppressed.

In addition, desirably, the waste heat recovery system further includes: a first bypass flow channel which bypasses the heater; a first bypass valve provided in the first bypass flow channel; a second bypass flow channel which bypasses the expander; a second bypass valve provided in the second bypass flow channel; and a shut-off valve which can shut off the inflow of the working medium which has flowed out from the heater, to the expander, wherein the controller halts the circulating pump, and also opens the first bypass valve and the second bypass valve and closes the shut-off valve while maintaining the degree of opening of the adjustment valve at a designated degree of opening, when the temperature differential has become equal to or greater than the reference temperature, or when the pressure differential has become equal to or lower than the reference pressure.

By this means, damage to the system is suppressed more reliably. More specifically, by halting the circulating pump and closing the shut-off valve, as well as opening the first bypass valve and the second bypass valve, the working medium at high temperature which has recovered the waste heat of the supercharged air in the heater merges with the working medium in liquid form at low temperature which has passed through the first bypass flow channel on the downstream side of the circulating pump, and then flows into the condenser via the second bypass flow channel and is thereby condensed. In other words, the working medium at high temperature flowed out from the heater is cooled by the working medium at low temperature which has passed through the first bypass flow channel on the downstream side of the circulating pump, and therefore damage to the sealing material, etc. due to the working medium becoming too hot on the downstream side of the heater is suppressed.

More specifically, desirably, the controller closes the adjustment valve when the temperature of the working medium located between the first bypass flow channel and the expander on the downstream side of the heater has become equal to or lower than a threshold value.

By adopting this configuration, since the full amount of the cooling medium is supplied to the air cooler after the temperature of the working medium located between the first bypass flow channel and the expander on the downstream side of the heater has become equal to or lower than the threshold value, then it is possible to cool the supercharged air efficiently in the air cooler.

Furthermore, desirably, when the temperature of the supercharged air after having flowed out from the air cooler is equal to or lower than a designated temperature which is lower than the set temperature, the controller adjusts the degree of opening of the adjustment valve, in such a manner that a temperature differential obtained by subtracting a temperature of the cooling medium before flowing into the condenser from the temperature of the cooling medium after having flowed out from the condenser becomes a specified temperature or in such a manner that a pressure differential obtained by subtracting a pressure of the cooling medium after having flowed out from the condenser from the pressure of the cooling medium before flowing into the condenser becomes a specified pressure.

By adopting this configuration, the amount of cooling medium supplied to the condenser when the temperature of the supercharged air which has flowed out from the air cooler is equal to or lower that the designated temperature is stabilized. More specifically, the relationship between the temperature differential and the amount of cooling medium flowing in the branch pipe is determined in advance, the cross-sectional area of the branch pipe is also measured in advance, and therefore it is possible to calculate the amount of cooling medium flowing in the branch pipe from the cross-sectional area and the pressure differential. Therefore, the amount of cooling medium supplied to the condenser is stabilized by adjusting the degree of opening of the adjustment valve, in such a manner that the temperature differential becomes the specified temperature, or the pressure differential becomes the specified pressure. Consequently, it is possible to recover the motive power stably, in the power recovery device.

In this case, desirably, the controller adjusts the number of revolutions of the circulating pump in such a manner that the temperature of the cooling medium after having flowed out from the condenser is equal to or lower than a defined value.

By adopting this configuration, the effects of the cooling medium which has flowed out from the condenser on the ambient environment are suppressed.

Furthermore, desirably, in the present embodiment, the engine is a ship engine; the cooling medium supply pipe is configured to be able to supply seawater, as the cooling medium, into the air cooler; and the branch pipe is configured to be able to supply seawater, as the cooling medium, into the condenser.

By adopting this configuration, it is possible to recover the waste heat of the supercharged air supplied to the ship engine, efficiently, by using seawater, rather than providing a special supply source for supplying a cooling medium to the air cooler and the condenser.

Furthermore, the waste heat recovery method according to a further aspect of the present embodiment is a method for recovering the waste heat of the supercharged air supplied to the engine. This waste heat recovery method includes: an evaporating step of evaporating a working medium by a heater, by supplying the supercharged air to the heater; a cooling step of cooling the supercharged air by exchanging heat between the supercharged air which has flowed out from the heater and the cooling medium, by an air cooler; a power recovery step of recovering motive power from the working medium, by expanding the working medium which has flowed out from the heater, by an expander; and a condensing step of condensing the working medium which has flowed out from the expander, by a condenser, wherein, in the condensing step, the working medium is condensed in the condenser by bifurcating a part of the cooling medium supplied to the air cooler in the cooling step, to the condenser, and an amount of the cooling medium supplied to the condenser is adjusted in such a manner that a temperature of the supercharged air which has flowed out from the air cooler becomes equal to or less than a set temperature.

In the present waste heat recovery method, it is possible to recover waste heat from the supercharged air, efficiently, while obtaining supercharged air which has been cooled appropriately in such a manner that the temperature thereof becomes equal to or lower than a set temperature.

In this case, desirably, the waste heat recovery method further includes a working medium circulating step of sending the working medium which has flowed out from the condenser, to the heater, wherein, in the working medium circulating step, a sending operation for sending, to the heater, the working medium which has flowed out from the condenser is halted, when a temperature differential obtained by subtracting a temperature of the cooling medium before flowing into the condenser from the temperature of the cooling medium after having flowed out from the condenser has become equal to or greater than the reference temperature, or when a pressure differential obtained by subtracting a pressure of the cooling medium after having flowed out from the condenser from the pressure of the cooling medium before flowing into the condenser has become equal to or lower than a reference pressure.

Furthermore, desirably, in the condensing step, the amount of the cooling medium supplied to the condenser is maintained so as to fall within a prescribed range, when the temperature differential has become equal to or greater than the reference temperature, or when the pressure differential has become equal to or lower than the reference pressure, and in the working medium circulating step, when the temperature differential has become equal to or greater than the reference temperature, or when the pressure differential has become equal to or lower than the reference pressure, the sending operation is halted, the working medium after having flowed out from the condenser before flowing into the heater is merged with the working medium which has flowed out from the heater, and the merged working medium is made to flow to the condenser without flowing into the expander.

More specifically, desirably, in the condensing step, the supply of the cooling medium to the condenser is halted when the temperature of the working medium after merging has become equal to or lower than a threshold value.

By adopting this configuration, after the temperature of the working medium after merging has become equal to or lower than the threshold value, then the full amount of the cooling medium is supplied to the air cooler, and therefore the supercharged air can be cooled efficiently in the air cooler.

Furthermore, in the present embodiment, in the condensing step, when the temperature of the supercharged air which has flowed out from the air cooler is equal to or lower than a designated temperature which is lower than the set temperature, the amount of cooling medium supplied to the condenser is adjusted, in such a manner that a temperature differential obtained by subtracting a temperature of the cooling medium before flowing into the condenser from the temperature of the cooling medium after having flowed out from the condenser becomes a specified temperature, or in such a manner that a pressure differential obtained by subtracting a pressure of the cooling medium after having flowed out from the condenser from the pressure of the cooling medium before flowing into the condenser becomes a specified pressure.

By adopting this configuration, the amount of cooling medium supplied to the condenser is stable, and therefore it is possible to recover the motive power stably.

In this case, desirably, in the condensing step, the amount of cooling medium supplied to the condenser is adjusted in such a manner that the temperature of the cooling medium after having flowed out from the condenser is equal to or lower than a defined value.

By adopting this configuration, the effects of the cooling medium which has flowed out from the condenser on the ambient environment are suppressed.

Furthermore, in the present embodiment, desirably, a ship engine is used as the engine, and seawater is used as the cooling medium which is supplied to the air cooler and the condenser.

This application is based on Japanese Patent application No. 2014-077647 filed in Japan Patent Office on Apr. 4, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A waste heat recovery system, comprising:
    a heater which evaporates a working medium by exchanging heat between supercharged air supplied to an engine and the working medium;
    an expander which expands the working medium which has flowed out from the heater;
    a power recovery device connected to the expander;
    a condenser which condenses the working medium which has flowed out from the expander;
    a cooling medium supply pipe for supplying a cooling medium to an air cooler which cools the supercharged air which has flowed out from the heater;
    a cooling medium pump which is provided in the cooling medium supply pipe and which sends the cooling medium to the air cooler; and
    a branch pipe which directs a part of the cooling medium flowing in the cooling medium supply pipe, to the condenser, in such a manner that the working medium is cooled by the cooling medium.

2. The waste heat recovery system according to claim 1, further comprising:
    an adjustment valve which is provided in the branch pipe, the degree of opening thereof being adjustable; and
    a controller which controls the degree of opening of the adjustment valve in such a manner that a temperature of the supercharged air which has flowed out from the air cooler is equal to or lower than a set temperature.

3. The waste heat recovery system according to claim 2, further comprising:
    a circulating pump which sends the working medium which has flowed out from the condenser to the heater,
    wherein the controller halts the circulating pump, when a temperature differential obtained by subtracting the temperature of the cooling medium before flowing into the condenser from the temperature of the cooling medium after having flowed out from the condenser has become equal to or greater than a reference temperature, or when a pressure differential obtained by subtracting a pressure of the cooling medium after having flowed out from the condenser from the pressure of the cooling medium before flowing into the condenser has become equal to or lower than a reference pressure.

4. The waste heat recovery system according to claim 3, further comprising:
    a first bypass flow channel which bypasses the heater;
    a first bypass valve provided in the first bypass flow channel;
    a second bypass flow channel which bypasses the expander;
    a second bypass valve provided in the second bypass flow channel; and
    a shut-off valve which can shut off the inflow of the working medium which has flowed out from the heater, to the expander,
    wherein the controller halts the circulating pump, and also opens the first bypass valve and the second bypass valve and closes the shut-off valve while maintaining the degree of opening of the adjustment valve at a designated degree of opening, when the temperature differential has become equal to or greater than the reference temperature, or when the pressure differential has become equal to or lower than the reference pressure.

5. The waste heat recovery system according to claim 4, wherein the controller closes the adjustment valve when the temperature of the working medium located between the first bypass flow channel and the expander on the downstream side of the heater has become equal to or lower than a threshold value.

6. The waste heat recovery system according to claim 2, wherein, when the temperature of the supercharged air after having flowed out from the air cooler is equal to or lower than a designated temperature which is lower than the set temperature, the controller adjusts the degree of opening of the adjustment valve, in such a manner that a temperature differential obtained by subtracting a temperature of the cooling medium before flowing into the condenser from the temperature of the cooling medium after having flowed out from the condenser becomes a specified temperature: or in such a manner that a pressure differential obtained by subtracting a pressure of the cooling medium after having flowed out from the condenser from the pressure of the cooling medium before flowing into the condenser becomes a specified pressure.

7. The waste heat recovery system according to claim 6, wherein the controller adjusts the number of revolutions of the circulating pump in such a manner that the temperature of the cooling medium after having flowed out from the condenser is equal to or lower than a defined value.

8. The waste heat recovery system according to claim 1, wherein the engine is a ship engine,
    the cooling medium supply pipe is configured to be able to supply seawater, as the cooling medium, into the air cooler, and
    the branch pipe is configured to be able to supply seawater, as the cooling medium, into the condenser.

9. A waste heat recovery method for recovering waste heat from supercharged air supplied to an engine; comprising:
    evaporating a working medium by a heater, by supplying the supercharged air to the heater;
    cooling the supercharged air by exchanging heat between the supercharged air which has flowed out from the heater and the cooling medium, by an air cooler;
    recovering motive power from the working medium, by expanding the working medium which has flowed out from the heater, by an expander; and
    condensing the working medium which has flowed out from the expander, by a condenser,
    wherein, the working medium is condensed in the condenser by directing a part of the cooling medium supplied to the air cooler in the cooling step, to the condenser, and an amount of the cooling medium supplied to the condenser is adjusted in such a manner that a temperature of the supercharged air which has flowed out from the air cooler becomes equal to or less than a set temperature.

10. The waste heat recovery method according to claim 9, further comprising:
a working medium circulating step of sending the working medium which has flowed out from the condenser, to the heater,
wherein, in the working medium circulating step, a sending operation for sending, to the heater, the working medium which has flowed out from the condenser is halted, when a temperature differential obtained by subtracting a temperature of the cooling medium before flowing into the condenser from the temperature of the cooling medium after having flowed out from the condenser has become equal to or greater than the reference temperature, or when a pressure differential obtained by subtracting a pressure of the cooling medium after having flowed out from the condenser from the pressure of the cooling medium before flowing into the condenser has become equal to or lower than a reference pressure.

11. The waste heat recovery method according to claim 10,
wherein, in the condensing step, the amount of the cooling medium supplied to the condenser is maintained so as to fall within a prescribed range, when the temperature differential has become equal to or greater than the reference temperature, or when the pressure differential has become equal to or lower than the reference pressure, and
in the working medium circulating step, when the temperature differential has become equal to or greater than the reference temperature, or when the pressure differential has become equal to or lower than the reference pressure, the sending operation is halted, the working medium after having flowed out from the condenser before flowing into the heater is merged with the working medium which has flowed out from the heater, and the merged working medium is made to flow to the condenser without flowing into the expander.

12. The waste heat recovery method according to claim 11, wherein, in the condensing step, the supply of the cooling medium to the condenser is halted when the temperature of the working medium after merging has become equal to or lower than a threshold value.

13. The waste heat recovery method according to claim 9, wherein, in the condensing step, when the temperature of the supercharged air which has flowed out from the air cooler is equal to or lower than a designated temperature which is lower than the set temperature, the amount of cooling medium supplied to the condenser is adjusted, in such a manner that a temperature differential obtained by subtracting a temperature of the cooling medium before flowing into the condenser from the temperature of the cooling medium after having flowed out from the condenser becomes a specified temperature, or in such a manner that a pressure differential obtained by subtracting a pressure of the cooling medium after having flowed out from the condenser from the pressure of the cooling medium before flowing into the condenser becomes a specified pressure.

14. The waste heat recovery method according to claim 13, wherein, in the condensing step, the amount of cooling medium supplied to the condenser is adjusted in such a manner that the temperature of the cooling medium after having flowed out from the condenser is equal to or lower than a defined value.

15. The waste heat recovery method according to claim 9,
wherein a ship engine is used as the engine, and
seawater is used as the cooling medium which is supplied to the air cooler and the condenser.

* * * * *